Jan. 5, 1937.  H. G. KELLOGG  2,067,088
VEHICLE VENTILATING WINDOW
Filed Dec. 18, 1933   3 Sheets-Sheet 1
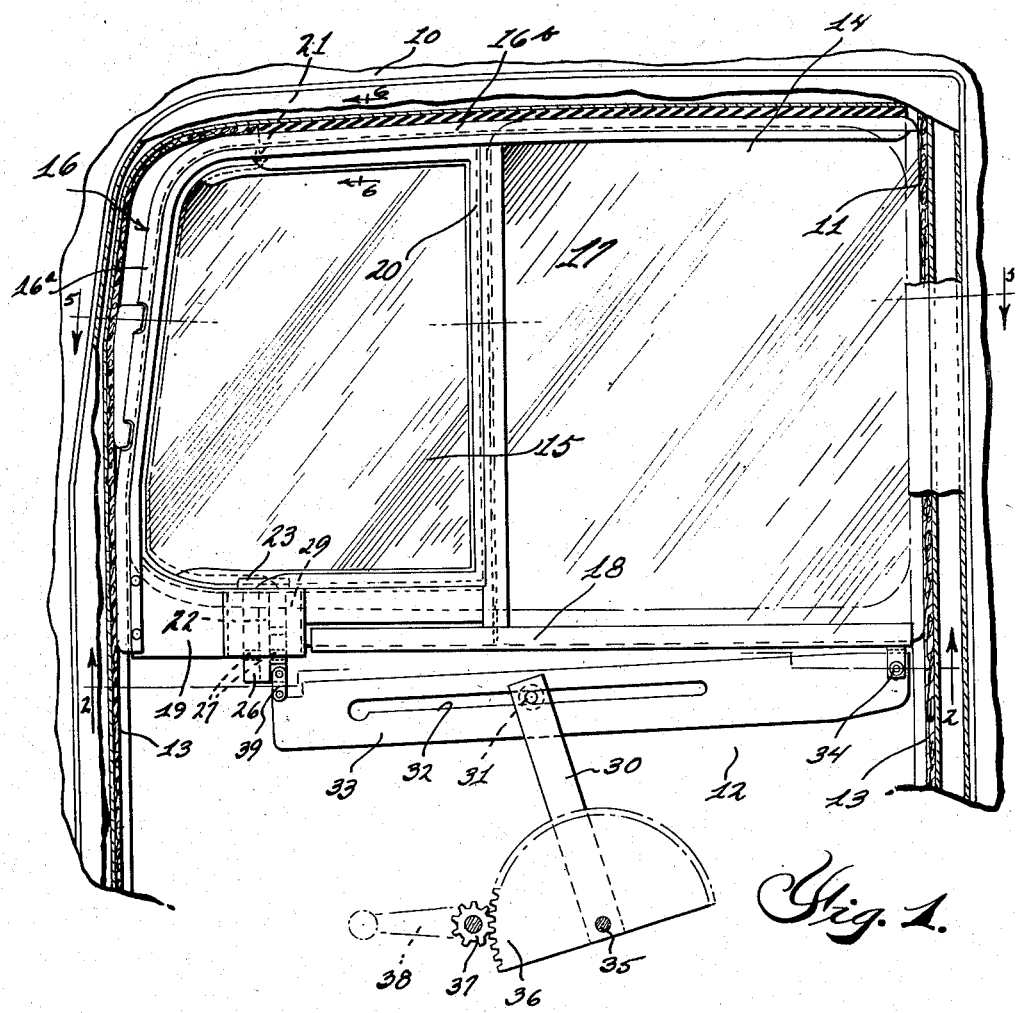
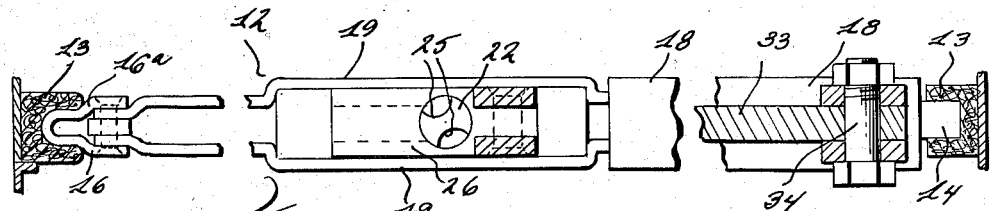
INVENTOR
Homer G. Kellogg
BY
Whittemore Hulbert Whittemore & Belknap
ATTORNEYS

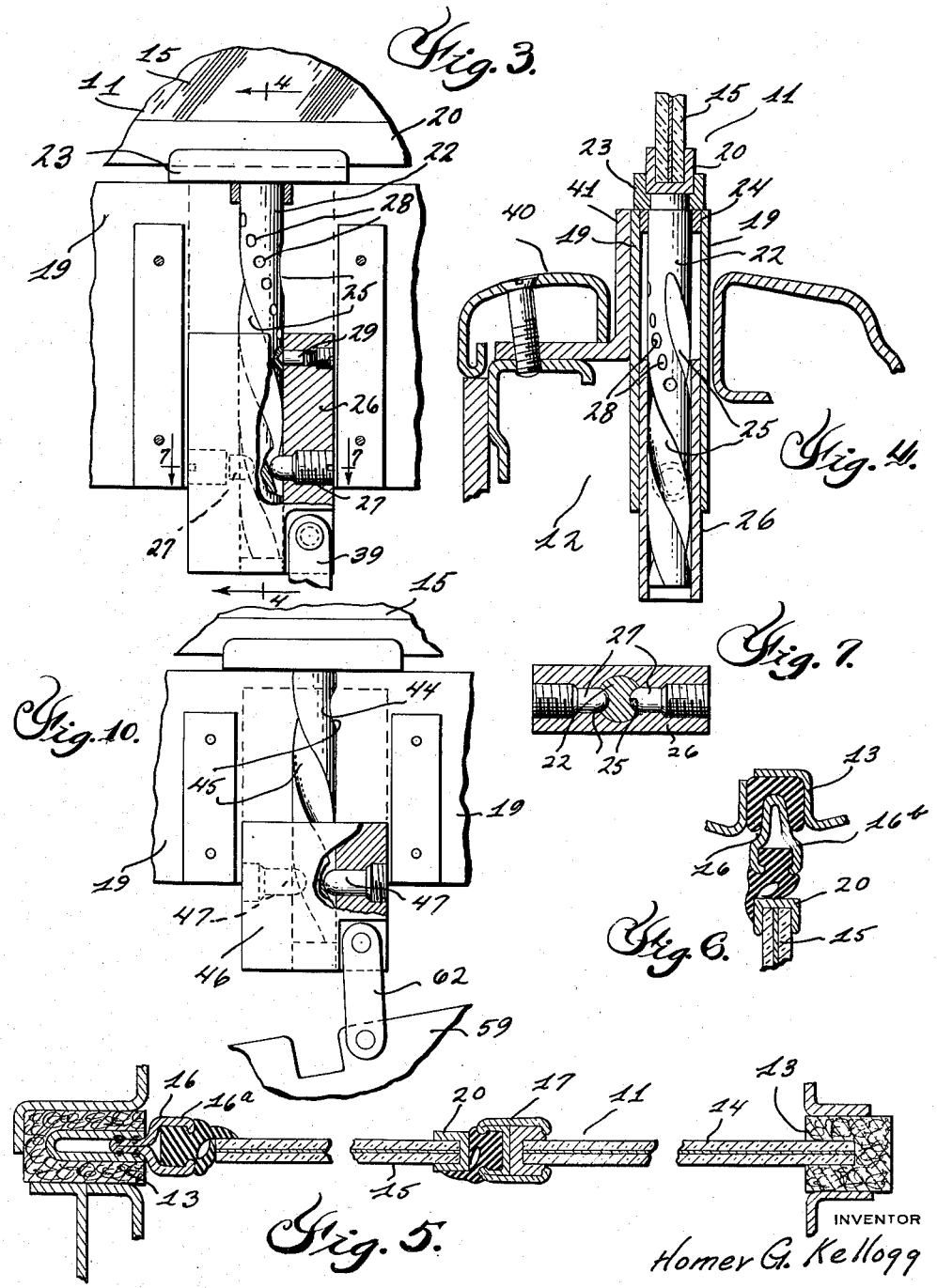

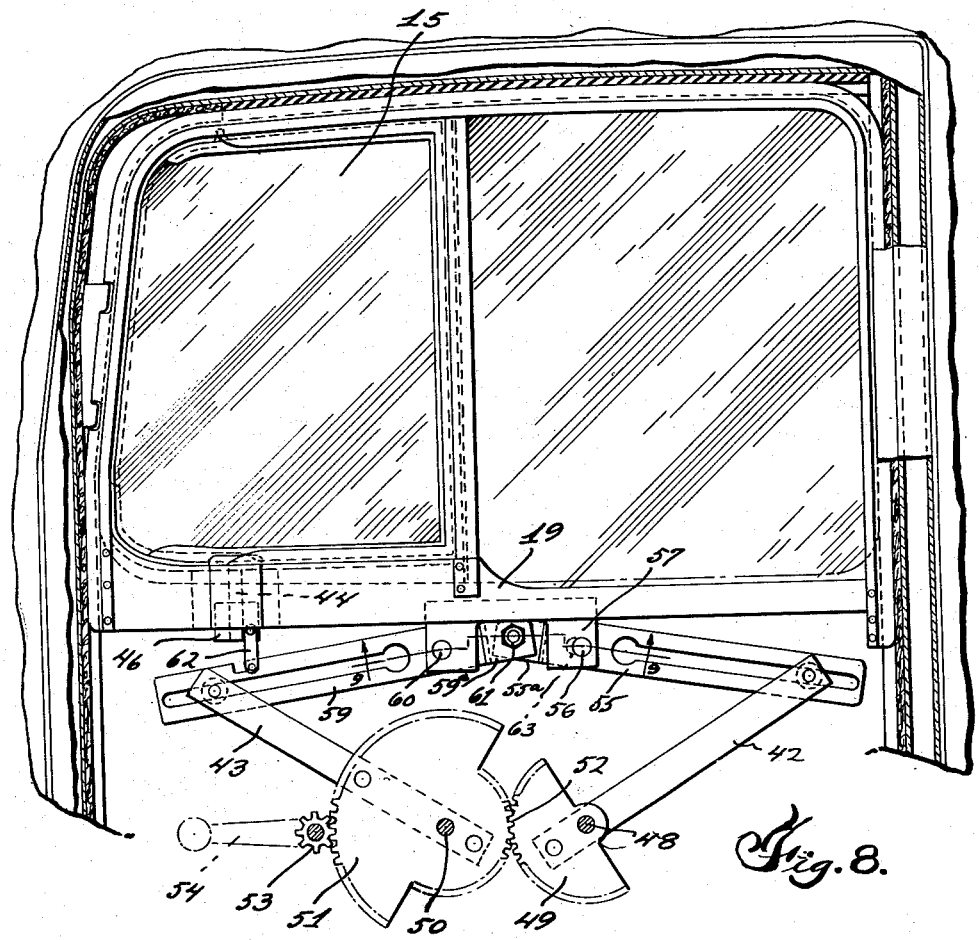
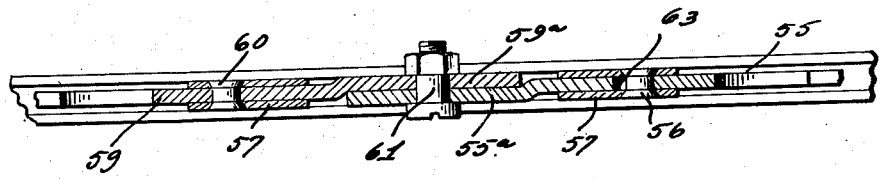
Fig. 8.
Fig. 9.
INVENTOR
Homer G. Kellogg

Patented Jan. 5, 1937

2,067,088

UNITED STATES PATENT OFFICE 2,067,088

VEHICLE VENTILATING WINDOW

Homer G. Kellogg, Detroit, Mich., assignor to Motor Products Corporation, Detroit, Mich., a corporation of New York Application December 18, 1933, Serial No. 703,008

10 Claims. (Cl. 296—44)

This invention relates to vehicle ventilating windows and more especially to ventilating window constructions designed for use in the closed bodies of motor vehicles and the like.

One of the objects of the invention is to provide an improved window construction having means whereby the normal forward motion of the vehicle may be utilized to ventilate the interior of the vehicle.

Another object of the invention is to provide a ventilating window structure in the form of a composite window opening closure having a portion thereof pivoted on substantially vertically arranged pivots for swinging movement out of the plane of the remainder of the composite window closure together with a single operating means for raising and lowering the composite window and for actuating the pivoted panel.

The several objects, advantages and novel details of construction of several forms of the invention will be made more apparent as this description proceeds, especially when considered in connection with the accompanying drawings, wherein Figure 1 is a fragmentary sectional elevational view of a vehicle body provided with a window casing and opening for a ventilating window structure constructed in accordance with my invention;

Figure 2 is an enlarged sectional elevational view taken substantially on the plane indicated by line 2—2 of Figure 1 looking in the direction of the arrows;

Figure 3 is an enlarged sectional elevational view of a portion of the pivoted panel operating means;

Figure 4 is a detail sectional view taken substantially on the plane indicated by line 4—4 of Figure 3;

Figure 5 is an enlarged sectional view, with part of the glass broken away, taken substantially on the plane indicated by line 5—5 of Figure 1;

Figure 6 is a detail sectional view taken substantially on the plane indicated by line 6—6 of Figure 1;

Figure 7 is a detail sectional view taken substantially on the plane indicated by line 7—7 of Figure 3;

Figure 8 is a view similar to Figure 1 showing a slightly modified form of construction;

Figure 9 is an enlarged fragmentary sectional view taken substantially on the plane indicated by line 9—9 of Figure 8 looking in the direction of the arrows, and Figure 10 is a view similar to Figure 3 showing the pivoted panel operating means illustrated in Figure 8.

Referring now more particularly to the drawings, and more especially to Figures 1 to 7 inclusive, it will be noted that there is fragmentarily illustrated a portion 10 of a vehicle body or door provided with a casing having a window opening 11 and a well or recess 12 arranged therebelow. The reference character 13 indicates the usual window glass channel arranged in the casing surrounding the window opening and extending down into the well 12 and in which the composite window for closing the window opening is adapted to slide.

In accordance with the present invention, the composite window comprises a panel 14 adapted to partake only of vertical sliding movement, and a panel 15 adapted to partake of both vertical sliding and pivotal movement. In the embodiment illustrated in Figure 1, a frame member 16 is provided having a vertical leg 16$^a$ extending along one vertical edge of the composite window and a horizontal leg 16$^b$ extending across the top of the composite window.

Arranged between the panels 14 and 15 is a frame member 17 which is secured at its upper end to the leg 16$^b$ of the frame 16 and at its lower end to a glass supporting channel 18 in which the lower end of the panel 14 is secured. Extending between the frame members 16$^a$ and 17 is a frame member formed preferably of a pair of spaced plates 19.

The pivot panel 15 is preferably, although not necessarily, provided with a frame 20 which may extend partly or completely around the panel 15. This panel 15 is pivoted on substantially vertically arranged pivots journalled in the upper and lower frame members 16$^b$ and 19, the upper pivot being indicated by the reference character 21. The lower pivot is in the form of a rotatably mounted shaft or screw 22, the upper end of which is secured to the frame 20 of the channel by means of a channel shaped shoe or the like 23. This pivot shaft 22 extends between the pair of spaced plates 19 and is journalled therein as at 24 (see particularly Figure 4). This shaft is formed with one or more spiral grooves or channels 25 extending from one end thereof to the other. A nut or collar member 26 is mounted on the shaft 22, this nut being provided with blocks or inserts 27 engaged in the spiral grooves for imparting a rotary movement to the shaft 22 when the nut is moved longitudinally of the shaft.

The nut 26 is slidably but non-rotatably mounted between the spaced plates 19 and is adapted to be vertically reciprocated in a manner yet to be described. It will be obvious that upon such movement of the nut the shaft 22 will be rotated and the pivoted panel 15 will be angularly adjusted about its pivots.

The shaft 22 may be provided with a spirally arranged series of recesses 28 with which a spring pressed detent 29 carried by the nut 26 is adapted to engage. The engagement of detent 29 with any one of the recesses 28 will prevent accidental rotation of the shaft 22 and thus the pivoted panel may be held in any of its adjusted positions.

The composite window structure is adapted to be raised and lowered in the customary manner by any conventional or desired type of window lifter mechanism. In the embodiment of the invention herein illustrated the window lifter mechanism is shown comprising a lifter arm 30 having a pin or roller 31 working in a slot 32 of a lifting lever 33 which is pivotally connected at one end as at 34 to the frame member 18 of the composite window structure. The lifter arm 30 is swung about its pivot 35 by means of a gear segment 36 with which a pinion 37 meshes this pinion being rotated by means of a lifter handle 38.

After the composite window structure has been raised into registration with the window opening, the further movement of the lifter arm 30 acts to swing the lifting lever 33 about its pivot 34 and thus through links 39 imparts a vertical sliding movement to the nut 26. Thus during this latter part of the movement of the lifter mechanism, the nut 26 is moved vertically along the pivot shaft 22 and, as heretofore described, rotates this shaft and angularly adjusts the pivoted panel 15. The reverse movement of the window lifter mechanism first moves the pivoted panel into the plane of the panel 14 and then lowers the composite window structure into the well 12.

Secured to a stationary part of the vehicle body or door, as for instance at the sill 40, (see particularly Figure 4), is a closing plate 41. When the composite window structure is fully raised into registration with the window opening the lower face of the shoe 23 clears the upper edge of this plate 41 so that the further movement of the window lifter mechanism can impart the desired angular adjustment to the pivoted panel 15. In lowering the composite window structure the pivoted panel must first be moved to closed position and thus arranged in the plane of the panel 14, and when in this position the shoe 23 will be parallel with the upper edge of this closing plate 41 and free of the same so that the composite window structure may be lowered into the well. It is obvious that during all vertical movement of the pivoted panel any angular movement thereof is restrained by the plate 41 until, as heretofore described, the lower face of the shoe 23 has been raised clear of the upper edge of the plate whereupon this pivoted panel may be adjusted.

From the foregoing description it is obvious that both the vertical sliding movement of the composite window as well as the angular adjustment of the pivoted panel is accomplished by a single operating mechanism in the form of a window lifter.

In Figures 8, 9 and 10 a slightly modified form of construction is illustrated. In this form of construction a lifter mechanism comprising a pair of lifter arms 42 and 43 is employed, the advantage in this double arm type of lifter mechanism being that the lifting effort may be more uniformly applied and liability of the closure sliding non-uniformly eliminated. This is of particular advantage in wide window opening closures.

In this form of construction, the reference character 44 indicates the pivot shaft for the pivoted panel 15, provided as in the previously described form with one or more spiral grooves 45. The reference character 46 indicates a nut or collar longitudinally movable thereon provided with blocks or inserts 47 working in the grooves 45, this nut being slidably but non-rotatably movable between the space plates 19 as in the previously described construction.

The lifter arm 42 is moved about its pivot 48 by means of a gear sector 49 and the lifter arm 43 is moved about its pivot 50 by means of a gear sector 51. The gear sectors 49 and 51 are provided with an interengaging series of gear teeth 52 so that the movement imparted to the gear sector 51 will correspondingly move the gear sector 49. The gear sector 51 is actuated by means of a pinion 53 rotated by a lifter handle 54.

In order that the lifter arm 43 may partake of the additional movement necessary to operate the nut 46, it is also necessary to provide for a similar additional movement for the lifter arm 42. Thus instead of engaging a fixed guide, the lifter arm 42 engages a lifting lever 55 which is pivoted as at 56 on a bracket 57 secured to the bottom frame member 19 of the composite window structure. The other lifter arm 43 engages a companion lifter lever 59 which is pivotally mounted as at 60 on the bracket 57. The ends of these two lifter levers 55 and 59 have overlapping ends offset as at 59a and 55a, respectively, these overlapping ends being pivotally interconnected as at 61. Thus they partake of uniform pivotal movement and the effort exerted by the lifting lever 59 through the link 62 to the nut 46 is distributed to both of these lifting levers. The lifting lever 55, at its pivot 56, is provided with a slot 63 (see particularly Figure 9) so that this lifting lever may partake of a slight longitudinal movement as the pivot 61 moves downwardly, as viewed in Figure 8.

In other respects this structure is substantially the same as that previously described in that a single lifter window mechanism is employed for raising and lowering a composite window opening closure and for angularly adjusting the pivoted panel of this composite structure.

Various modifications and rearrangements may suggest themselves to those skilled in this art, and to this end reservation is made to make such changes as may come within the purview of the accompanying claims.

What I claim as my invention is:

1. In a regulator mechanism for a vehicle window ventilator having a window movable vertically to and from closed position, a panel at one side edge of said window and movable with said window, and a mounting for said panel affording swinging movements thereof on a vertically disposed axis when in raised position, said regulator mechanism comprising a device for conjointly raising and lowering said window and panel, an arm pivotally connected to the window on an axis disposed at substantially right angles to the axis of said panel, means to impart swinging movement to said panel from a rocking movement of said arm, and means actuated by said device for rocking said arm.

2. In a regulator mechanism for a vehicle window ventilator having a window movable vertically to and from closed position, a panel at one side edge of said window and movable with said window and a mounting for said panel affording swinging movements thereof on a vertically disposed axis when in raised position, said regulator mechanism comprising a device for conjointly raising and lowering said window and panel, screw means for swinging said panel on its axis, and means actuated by said device for operating said screw means substantially after said window and panel have been raised to closed position.

3. In a regulator mechanism for a vehicle window ventilator having a window movable vertically to and from closed position, a panel at one side edge of said window and movable with said window, and a mounting for said panel affording swinging movements thereof on a vertically disposed axis when in raised position, said regulator mechanism comprising a device for conjointly raising and lowering said window and panel, means for imparting swinging movement to said panel including a threaded shaft secured to said panel, a nut on said shaft, means to prevent turning of said nut, and means actuated by said device for moving said nut longitudinally of said shaft.

4. In a regulator mechanism for a vehicle window ventilator having a window movable vertically to and from closed position, a panel at one side edge of said window and movable with said window and a mounting for said panel affording swinging movements thereof on a vertically disposed axis when in raised position, said regulator mechanism comprising a device for conjointly raising and lowering said window and panel, means for imparting swinging movement to said panel to provide or close a ventilating opening, said last means comprising an helically grooved shaft secured at one end to said panel, a nut on said shaft, means to prevent rotation of said nut, and lever means actuated by said regulator mechanism for moving said nut in one direction or the other.

5. In a regulator mechanism for a vehicle window ventilator having a window movable vertically to and from closed position, a panel at one side edge of said window and movable with said window, and a mounting for said panel affording swinging movements thereof on a vertically disposed axis when in raised position, said regulator mechanism comprising a device for conjointly raising and lowering said window and panel, means for imparting swinging movement to said panel to provide or close a ventilating opening, said last means comprising an helically grooved shaft secured at one end to said panel, a nut on said shaft, means to prevent rotation of said nut, and lever means actuated by said device for moving said nut in one direction or the other, said parts being so constructed and arranged as to prevent opening of said panel by a force exerted directly against same.

6. In a regulator mechanism for a vehicle window ventilator having a window movable vertically to and from closed position, a panel at one side edge of the window and movable with said window, and a mounting for said panel affording swinging movements thereof on a substantially vertically disposed axis when in raised position, a window lifter mechanism for raising and lowering the window and said panel as a unit, and a spiral drive device connecting the panel to the window lifter mechanism for effecting angular adjustment of the panel when the latter and window are in registration with the window opening.

7. In a regulator mechanism for a vehicle window ventilator having a window movable vertically to and from closed position, a panel at one side edge of the window and movable with said window, and a mounting for the panel affording swinging movements thereof on substantially vertically disposed pivots when the panel is in its raised position, a spiral drive device connected to said panel, a window lifter mechanism for raising and lowering the window and panel as a unit, and means connecting the spiral drive device to the window lifter mechanism for adjusting the panel during a portion of the movement of the window lifter mechanism.

8. In a regulator mechanism for a vehicle window ventilator having a window movable vertically to and from closed position, a panel at one side of the window and movable with said window, and a mounting for the panel affording swinging movements thereof substantially on vertically disposed pivots when the panel is in its raised position, a window lifter mechanism for raising and lowering the window and panel as a unit, a spiral drive device connecting the panel to the window lifter mechanism and effecting angular adjustment of the panel, and means for holding the panel in its adjusted position.

9. In regulator mechanism for a vehicle window ventilator having a panel movable vertically to and from closed position, and a mounting for said panel affording swinging movements thereof on a vertically disposed axis when in raised position, said regulator mechanism comprising a device for raising and lowering the panel, screw means for swinging said panel on its axis, and means actuated by said device for operating said screw means substantially after said panel has been raised to closed position.

10. In a regulator mechanism for a panel mounted for swinging movements on a vertically disposed axis, said regulator mechanism comprising a vertically disposed helically threaded post secured to said panel, a pivotally mounted arm operatively connected to said post for imparting swinging movements to said panel from rocking movements of said arm, and manually operated crank means for actuating said arm.

HOMER G. KELLOGG.